(12) United States Patent
Liu

(10) Patent No.: US 11,308,898 B2
(45) Date of Patent: Apr. 19, 2022

(54) PIXEL ARRANGEMENT STRUCTURE AND DISPLAY PANEL

(71) Applicant: SHENZHEN CHINA STAR OPTOELECTRONICS SEMICONDUCTOR DISPLAY TECHNOLOGY CO., LTD., Shenzhen (CN)

(72) Inventor: Yongfeng Liu, Shenzhen (CN)

(*) Notice: Subject to any disclaimer, the term of this patent is extended or adjusted under 35 U.S.C. 154(b) by 0 days.

(21) Appl. No.: 16/627,354

(22) PCT Filed: Dec. 19, 2019

(86) PCT No.: PCT/CN2019/126483
§ 371 (c)(1),
(2) Date: Dec. 30, 2019

(87) PCT Pub. No.: WO2021/114344
PCT Pub. Date: Jun. 17, 2021

(65) Prior Publication Data
US 2021/0366419 A1    Nov. 25, 2021

(30) Foreign Application Priority Data

Dec. 10, 2019 (CN) .......................... 201911257686.1

(51) Int. Cl.
*G09G 3/36* (2006.01)
*G02F 1/1335* (2006.01)

(52) U.S. Cl.
CPC ..... *G09G 3/3607* (2013.01); *G02F 1/133514* (2013.01); *G09G 2300/0452* (2013.01); *G09G 2320/0233* (2013.01)

(58) Field of Classification Search
CPC ......... G09G 3/3607; G09G 2300/0452; G09G 2320/0233; G02F 1/133514
See application file for complete search history.

(56) References Cited

U.S. PATENT DOCUMENTS

| 2007/0002084 A1* | 1/2007 | Kimura | ............... G09G 3/3241 345/694 |
| 2010/0157232 A1 | 6/2010 | Kim et al. | |
| 2013/0135183 A1 | 5/2013 | Kimura et al. | |
| 2016/0171946 A1* | 6/2016 | Chen | ................. G02F 1/134309 345/58 |
| 2016/0377927 A1* | 12/2016 | Ye | ..................... G02F 1/133514 349/43 |
| 2018/0294281 A1 | 10/2018 | Gan | |

FOREIGN PATENT DOCUMENTS

| CN | 1892734 A | 1/2007 |
| CN | 101726954 A | 6/2010 |
| CN | 107015403 A | 8/2017 |
| CN | 110187539 A | 8/2019 |
| KR | 20110000823 A | 1/2011 |

* cited by examiner

*Primary Examiner* — Kenneth B Lee, Jr.

(57) ABSTRACT

A pixel arrangement structure and a display panel are provided. The pixel arrangement structure includes a plurality of sub-pixels having different colors. Each of the sub-pixels is divided into a main pixel area and a sub-pixel area, an area of the main pixel area is not equal to an area of the sub-pixel area, and at most every four columns, a position of the main pixel area and a position of the sub-pixel area are alternately changed to improve brightness uniformity of a display panel.

15 Claims, 7 Drawing Sheets

PIXEL ARRANGEMENT STRUCTURE AND DISPLAY PANEL

FIELD OF INVENTION

The present disclosure relates to the field of display technologies, and more particularly to a pixel arrangement structure and a display panel.

BACKGROUND OF INVENTION

With the rapid development of display technology, liquid crystal display panels have become the most widely used display devices.

An array substrate of each display panel includes a plurality of pixel units. Generally, in order to improve low color shift (LCS) in the display panel, each pixel unit is divided into a main pixel area and a sub-pixel area, and an area of the main pixel area is not equal to tan area of the sub-pixel area. An aperture ratio of the main pixel area is different from an aperture ratio of the sub-pixel area. Therefore, when an image is displayed, if positions of the main pixel area and the sub-pixel area are always arranged in a fixed manner, that is, positions of the main pixel area and the sub-pixel area in all columns are arranged in the same manner. In a horizontal direction, at a boundary between the main pixel area and the sub-pixel area, display brightness of the display panel will change, which will affect uniformity of display brightness of the display panel.

Therefore, in a current display panel technology, there is also an issue that the pixel arrangement structure in the display panel has different ways, which affects uniformity of the display brightness of the display panel, and it is urgently needed to improve.

Technical Problem

The present application relates to a pixel arrangement structure and a display panel, which are used to solve issues that the pixel arrangement structure in the display panel in the prior art has different ways and affects uniformity of display brightness of the display panel.

SUMMARY OF INVENTION

To solve the above issues, technical solutions provided in the present application are as follows.

An embodiment of the present invention provides a pixel arrangement structure, comprising: a plurality of sub-pixels having different colors, wherein each of the sub-pixels is divided into a main pixel area and a sub-pixel area, an area of the main pixel area is not equal to an area of the sub-pixel area, the main pixel area and the sub-pixel area are both rectangular, and at most every four columns, a position of the main pixel area and a position of the sub-pixel area are alternately changed to improve brightness uniformity of a display panel.

In an embodiment of the present invention, the plurality of sub-pixels having different colors are: a red sub-pixel, a green sub-pixel, and a blue sub-pixel, or the red sub-pixel, the green sub-pixel, the blue sub-pixel, and a white sub-pixel.

In an embodiment of the present invention, a pixel arrangement is such that each column is arranged by the main pixel area and the sub-pixel area at intervals, and the position of the main pixel area is exchanged with the position of the sub pixel area every other column; or each column is arranged by the main pixel area and the sub-pixel area at intervals, and the position of the main pixel area is exchanged with the position of the sub-pixel area every two columns; or each column is arranged by the main pixel area and the sub-pixel area at intervals, and the position of the main pixel area is exchanged with the position of the sub-pixel area every three columns; or each column is arranged by the main pixel area and the sub-pixel area at intervals, and the position of the main pixel area is exchanged with the position of the sub-pixel area every four columns.

In an embodiment of the present invention, the area of the sub-pixel area is greater than the area of the main pixel area.

In an embodiment of the present invention, the area of the sub-pixel area is less than the area of the main pixel area.

In an embodiment of the present invention, the main pixel area and the sub-pixel area both comprise four pixel domains, namely a first pixel domain, a second pixel domain, a third pixel domain, and a fourth pixel domain.

In an embodiment of the present invention, areas of at least two pixel domains of the first pixel domain, the second pixel domain, the third pixel domain, and the fourth pixel domain are same.

In an embodiment of the present invention, the four pixel domains of the main pixel area and the sub-pixel area are electrically connected to a trunk electrode having a cross shape, each of the four pixel domains further comprises a plurality of auxiliary electrodes, and the trunk electrode and the auxiliary electrodes together form a fish-bone pixel electrode.

In an embodiment of the present invention, the auxiliary electrodes comprise at least one density.

An embodiment of the present invention provides a pixel arrangement structure, comprising: a plurality of sub-pixels having different colors, wherein each of the sub-pixels is divided into a main pixel area and a sub-pixel area, an area of the main pixel area is not equal to an area of the sub-pixel area, and at most every four columns, a position of the main pixel area and a position of the sub-pixel area are alternately changed to improve brightness uniformity of a display panel.

In an embodiment of the present invention, the plurality of sub-pixels having different colors are: a red sub-pixel, a green sub-pixel, and a blue sub-pixel, or the red sub-pixel, the green sub-pixel, the blue sub-pixel, and a white sub-pixel.

In an embodiment of the present invention, a pixel arrangement is such that each column is arranged by the main pixel area and the sub-pixel area at intervals, and the position of the main pixel area is exchanged with the position of the sub pixel area every other column; or each column is arranged by the main pixel area and the sub-pixel area at intervals, and the position of the main pixel area is exchanged with the position of the sub-pixel area every two columns; or each column is arranged by the main pixel area and the sub-pixel area at intervals, and the position of the main pixel area is exchanged with the position of the sub-pixel area every three columns; or each column is arranged by the main pixel area and the sub-pixel area at intervals, and the position of the main pixel area is exchanged with the position of the sub-pixel area every four columns.

In an embodiment of the present invention, the area of the sub-pixel area is greater than the area of the main pixel area.

In an embodiment of the present invention, the area of the sub-pixel area is less than the area of the main pixel area.

In an embodiment of the present invention, the main pixel area and the sub-pixel area both comprise four pixel domains, namely a first pixel domain, a second pixel domain, a third pixel domain, and a fourth pixel domain.

In an embodiment of the present invention, areas of at least two pixel domains of the first pixel domain, the second pixel domain, the third pixel domain, and the fourth pixel domain are same.

In an embodiment of the present invention, the four pixel domains of the main pixel area and the sub-pixel area are electrically connected to a trunk electrode having a cross shape, each of the four pixel domains further comprises a plurality of auxiliary electrodes, and the trunk electrode and the auxiliary electrodes together form a fish-bone pixel electrode.

In an embodiment of the present invention, the auxiliary electrodes comprise at least one density.

An embodiment of the present invention provides a display panel, comprising: a color filter substrate, an array substrate disposed directly opposite to the color filter substrate, and a liquid crystal layer disposed between the color filter substrate and the array substrate; wherein the array substrate comprises the above pixel arrangement structure.

Beneficial Effect

Compared with the prior art, beneficial effects of the pixel arrangement structure and the display panel provided by embodiments of the present application are as follows.

1. The pixel arrangement structure provided in the embodiments of the present application includes sub-pixels having a plurality of colors, each of the sub-pixels is divided into a main pixel area and a sub-pixel area, an area of the main pixel area is not equal to an area of the sub-pixel area, and at most every four columns, that is, one column, two columns, three columns, or four columns, a position of the main pixel area and a position of the sub-pixel area are alternately changed. This can alleviate a low color shift design of the display panel and improve brightness uniformity of a display panel.

2. In the pixel arrangement structure provided in the embodiments of the present application, the area of the main pixel area is greater or less than the area of the sub-pixel area, the main pixel area and the sub-pixel area are further divided into four pixel domains: a first pixel domain, a second pixel domain, a third pixel domain, and a fourth pixel domain. The areas of at least two pixel domains are same, and the auxiliary electrodes include at least one density, which can further improve display brightness of the display panel.

DESCRIPTION OF DRAWINGS

In order to explain the technical solutions in the embodiments of the present application more clearly, the drawings used in the description of the embodiments will be briefly introduced below. Obviously, the drawings in the following description are only some embodiments of the present application. For those skilled in the art, other drawings can be obtained based on these drawings without paying creative efforts.

DETAILED DESCRIPTION OF PREFERRED EMBODIMENTS

Figure 1:
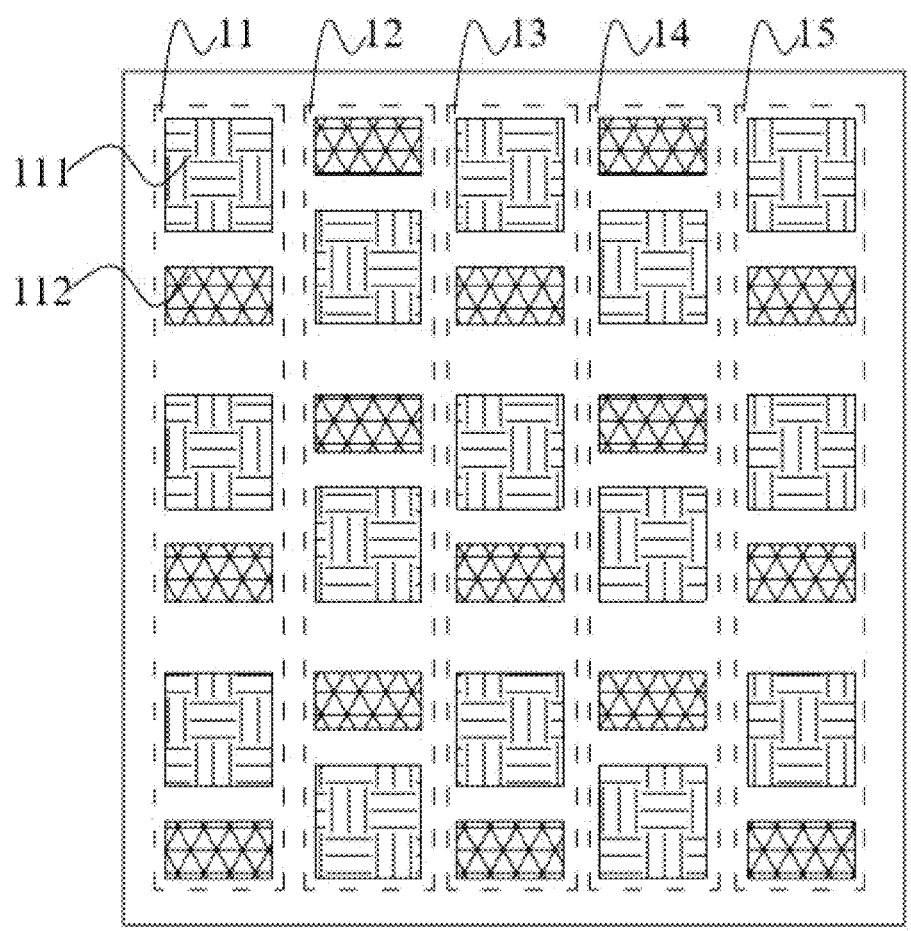
FIG. 1 is a first structural diagram of a pixel arrangement structure provided by an embodiment of the present application.
Figure 2:
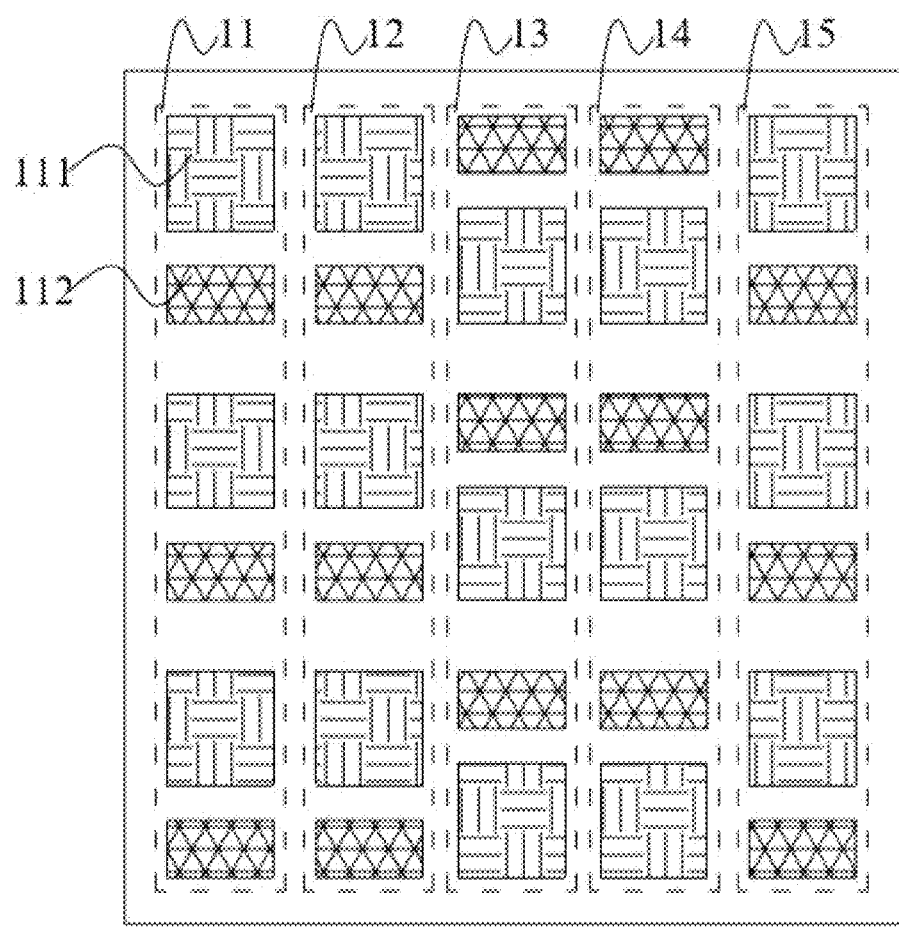
FIG. 2 is a second structural diagram of a pixel arrangement structure provided by an embodiment of the present application.
Figure 3:
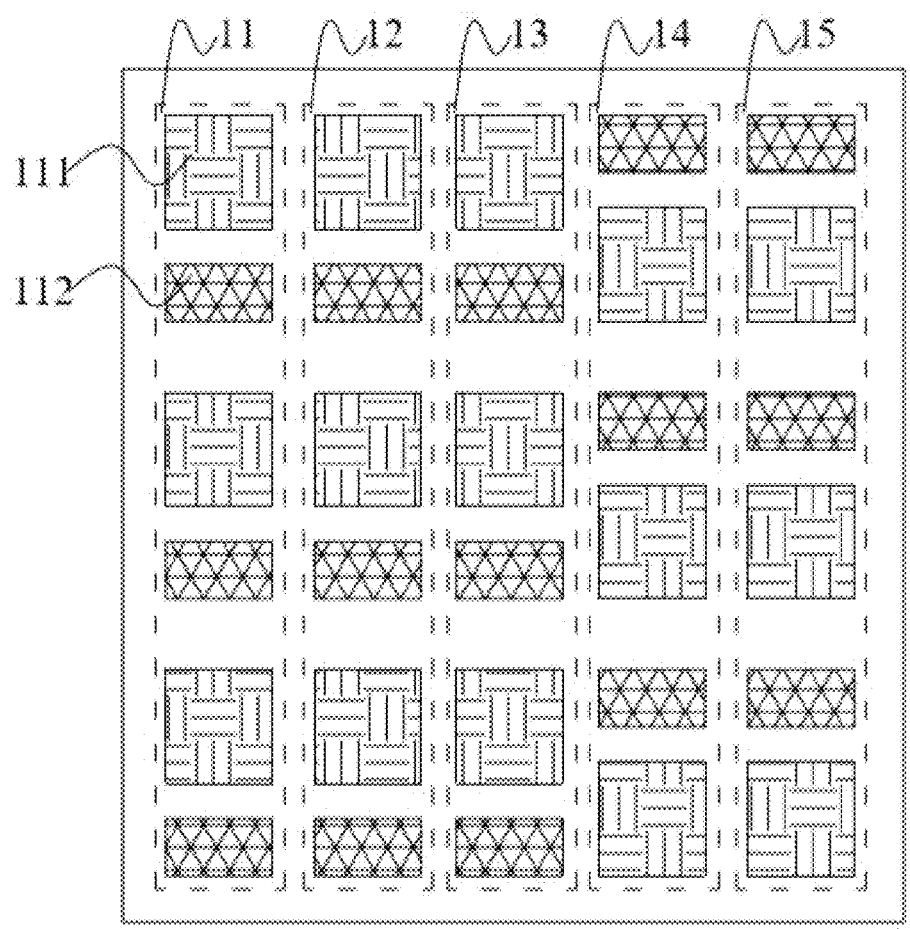
FIG. 3 is a third structural diagram of a pixel arrangement structure provided by an embodiment of the present application.
Figure 4:
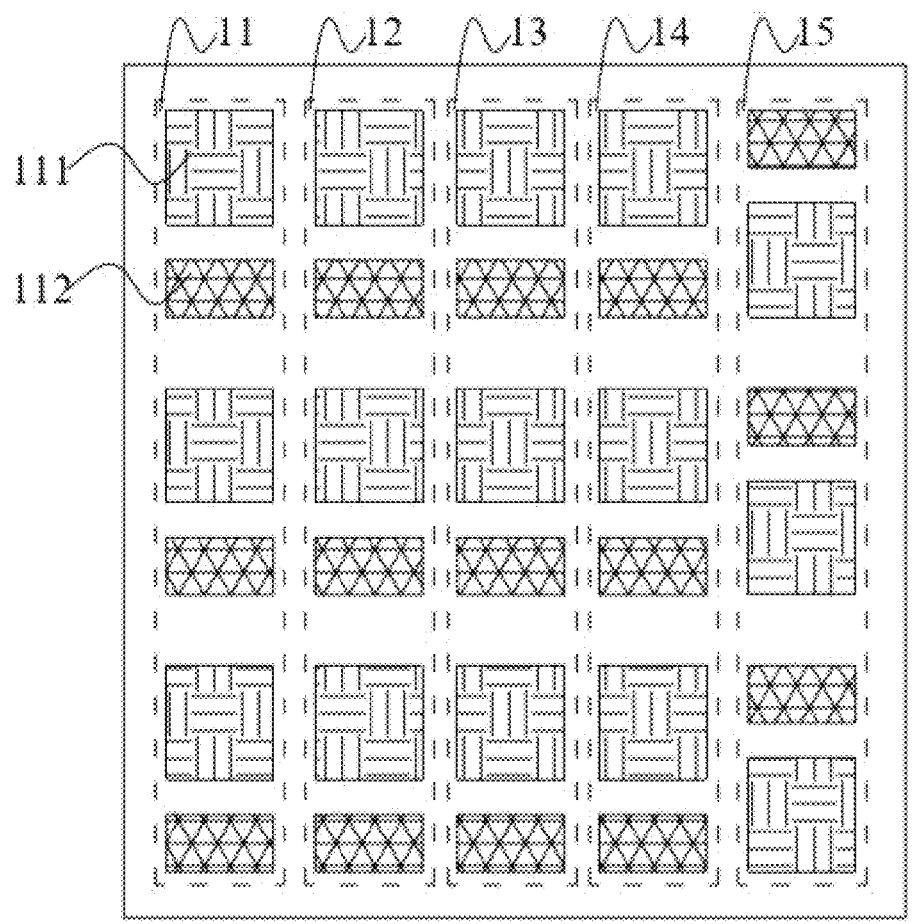
FIG. 4 is a fourth structural diagram of a pixel arrangement structure provided by an embodiment of the present application.

The technical solutions in the embodiments of the present application will be clearly and completely described below with reference to the accompanying drawings in the embodiments of the present application. Obviously, the described embodiments are only a part of the embodiments of the present application, but not all the embodiments. Based on the embodiments in the present application, all other embodiments obtained by those skilled in the art without creative efforts fall into the protection scope of the present application.

In the description of the present application, it should be understood that the terms "center", "longitudinal", "transverse", "length", "width", "thickness", "upper", "lower", "front", "rear", "left", "right", "vertical", "horizontal", "top", "bottom", "inside", "outside", "clockwise", "counterclockwise", etc. indicate an orientation or position relationship based on an orientation or position relationship shown in the drawings. This is only for the convenience of describing the present application and simplifying the description, and does not indicate or imply that the device or element referred to must have a specific orientation, be constructed and operate in a specific orientation, and therefore cannot be understood as a limitation on the present application. In addition, the terms "first" and "second" are used for descriptive purposes only and cannot be understood as indicating or implying relative importance or implicitly indicating the number of technical features indicated. Therefore, the features defined as "first" and "second" may explicitly or implicitly include one or more of the features. In the description of the present application, the meaning of "a plurality" is two or more, unless it is specifically defined otherwise.

In the description of this application, it should be noted that the terms "installation", "link", and "connection" should be understood in a broad sense unless otherwise specified and limited. For example, it can be a fixed connection, a detachable connection, or an integral connection; it can be a mechanical connection, an electrical connection, or can communicate with each other. It can be directly connected or indirectly connected through an intermediate medium. It can be the internal connection of two elements or the interaction between two elements. For those of ordinary skill in the art, the specific meanings of the above terms in this application can be understood according to specific situations.

In this application, unless explicitly stated and limited otherwise, the first feature "above" or "below" the second feature may include direct contact between the first and second features, may also include that the first and second features are not in direct contact but are contacted by another feature between them. Moreover, the first feature is "above", "over", and "on" the second feature, including that the first feature is directly above and obliquely above the second feature, or merely indicates that the first feature has a higher level than the second feature. The first feature is "below", "under", and "underneath" of the second feature, including the fact that the first feature is directly below and obliquely below the second feature, or merely indicates that the first feature has a lower level than the second feature.

The following disclosure provides many different implementations or examples for implementing different structures of the present application. To simplify the disclosure of this application, the components and settings of specific examples are described below. Of course, they are merely examples and are not intended to limit the application. In addition, the present application may repeat reference numbers and/or reference letters in different examples. This repetition is for the purpose of simplicity and clarity and does not in itself indicate the relationship between the various embodiments and/or settings discussed. In addition, this application provides examples of various specific processes and materials. However, those of ordinary skill in the art may recognize the application of other processes and/or the use of other materials.

The present application provides a pixel arrangement structure and a display panel. Please refer to FIG. 1 to FIG. 8 for details.

An existing pixel arrangement structure of a display panel includes several sub-pixel units. Each sub-pixel unit is further divided into a main pixel area and a sub-pixel area. The main pixel area and the sub-pixel area are both rectangular. Areas of the main pixel area and the sub-pixel area are different. Aperture ratios of pixel areas with different areas are also different. Because areas of aperture ratios are different, it will affect light transmittance, and then affect uniformity of display brightness of the display panel. Therefore, embodiments of the present application provide a pixel arrangement structure and a display panel to solve the above issues.

Referring to FIG. 1, which is a first structural diagram of a pixel arrangement structure provided by an embodiment of the present application. The pixel arrangement structure includes multiple columns of sub-pixels, such as a first column of sub-pixels 11, a second column of sub-pixels 12, a third column of sub-pixels 13, a fourth column of sub-pixels 14, and a fifth column of sub-pixels 15. Each column of sub-pixels includes multiple sub-pixels having different colors. Each of the sub-pixels is divided into a main pixel area 111 and a sub-pixel area 112. An area of the main pixel area 111 is not equal to an area of the sub-pixel area 112. At most four columns, a position of the main pixel area 111 and a position of the sub-pixel area 112 are alternately changed to improve uniformity of display brightness of the display panel. That is, the position of the main pixel area 111 and the position of the sub-pixel area 112 may be exchanged after one interval, two intervals, three intervals, or four intervals. The position of the main pixel area 111 and the position of the sub-pixel area 112 are alternately set in a small range to improve whether the main pixel area 111 or the sub-pixel area 112 is on the same horizontal line, which makes non-uniform display brightness on the display panel.

In an embodiment of the present application, the plurality of sub-pixels having different colors are: a red sub-pixel, a green sub-pixel, and a blue sub-pixel. In another embodiment of the present application, the plurality of the sub-pixels having different colors are: a red sub-pixel, a green sub-pixel, a blue sub-pixel, and a white sub-pixel.

Further, in an embodiment, an area of the main pixel area 111 is larger than an area of the sub-pixel area 112, that is, an opening ratio of the main pixel area 111 is greater than an opening rate of the sub-pixel area 112, and brightness of the main pixel area 111 is greater than brightness of the sub-pixel area 112. If in the first column of the sub-pixel arrangement structure, the main pixel area 111 is located above the sub-pixel area 112, from top to bottom, all the sub-pixel units are sequentially cycled. In the sub-pixel arrangement structure of the second column, the sub-pixel area 112 is located above the main pixel area 111. From top to bottom, all the sub-pixel units are sequentially cycled. The sub-pixel arrangement structure of the third column is the same as the sub-pixel arrangement structure of the first column, and the sub-pixel arrangement structure of the fourth column is the same as the sub-pixel arrangement structure of the second column, and they are sequentially cycled. In another embodiment, referring to FIG. 2, the area of the main pixel area 111 is larger than the area of the sub-pixel area 112. If in the sub-pixel arrangement structure of the first column and the sub-pixel arrangement structure of the second column, the main pixel area 111 is located above the sub-pixel area 112, and all the sub-pixel units are sequentially cycled from top to bottom. In the sub-pixel arrangement structure of the third column and the sub-pixel arrangement structure of the fourth column, the sub-pixel area 112 is located above the main pixel area 111. From top to bottom, all the sub-pixel units are sequentially cycled. The fifth and sixth columns of sub-pixel arrangement structures are the same as the first and second columns of sub-pixel arrangement structures, and the third and four columns of the sub-pixel arrangement structures are the same as the seventh and eight columns of the sub-pixel arrangement structures, and are sequentially cycled. In another embodiment, referring to FIG. 3, the area of the main pixel area 111 is larger than the area of the sub-pixel area 112. If in the sub-pixel arrangement structure of the first column, the sub-pixel arrangement structure of the second column, and the sub-pixel arrangement structure of the third column, the main pixel area 111 is located above the sub-pixel area 112. From top to bottom, all sub-pixel units are sequentially cycled. In the fourth column of the sub-pixel arrangement, the fifth column of the sub-pixel arrangement, and the sixth column of the sub-pixel arrangement, the sub-pixel area 112 is located above the main pixel area 111. From top to bottom, all sub-pixel units are sequentially cycled. The seventh, eighth, and ninth columns of the sub-pixel arrangement structures are the same as the first, second, and third columns of the sub-pixel arrangement structures, and the tenth, eleventh, and twelfth columns of the sub-pixel arrangement structures are the same as the fourth, fifth, sixth columns of the sub-pixel arrangement structure, and are sequentially cycled. In another embodiment, referring to FIG. 4, the area of the main pixel area 111 is larger than the area of the sub-pixel area 112. If in the sub-pixel arrangement structure of the first column, the sub-pixel arrangement structure of the second column, the sub-pixel arrangement structure of the third column, and the sub-pixel arrangement structure of the fourth column, the main pixel area 111 is located above the sub-pixel area 112. From top to bottom, all sub-pixel units are sequentially cycled. In the fifth column of the sub-pixel arrangement, the sixth column of the sub-pixel arrangement, the seventh column of the sub-pixel arrangement, and the eighth column of the sub-pixel arrangement, the sub-pixel area 112 is located above the main pixel area 111. From top to bottom, all sub-pixel units are cycled in turn; the ninth, tenth, eleventh, and twelve-column sub-pixel arrangement structures are the same as the first, second, third, and fourth-column sub-pixel arrangement structures. The thirteenth, fourteenth, fifteenth, and sixteenth-column sub-pixel arrangement structures are the same as the fifth, sixth, seventh, and eighth-column of the sub-pixel arrangement structures.

Figure 5:
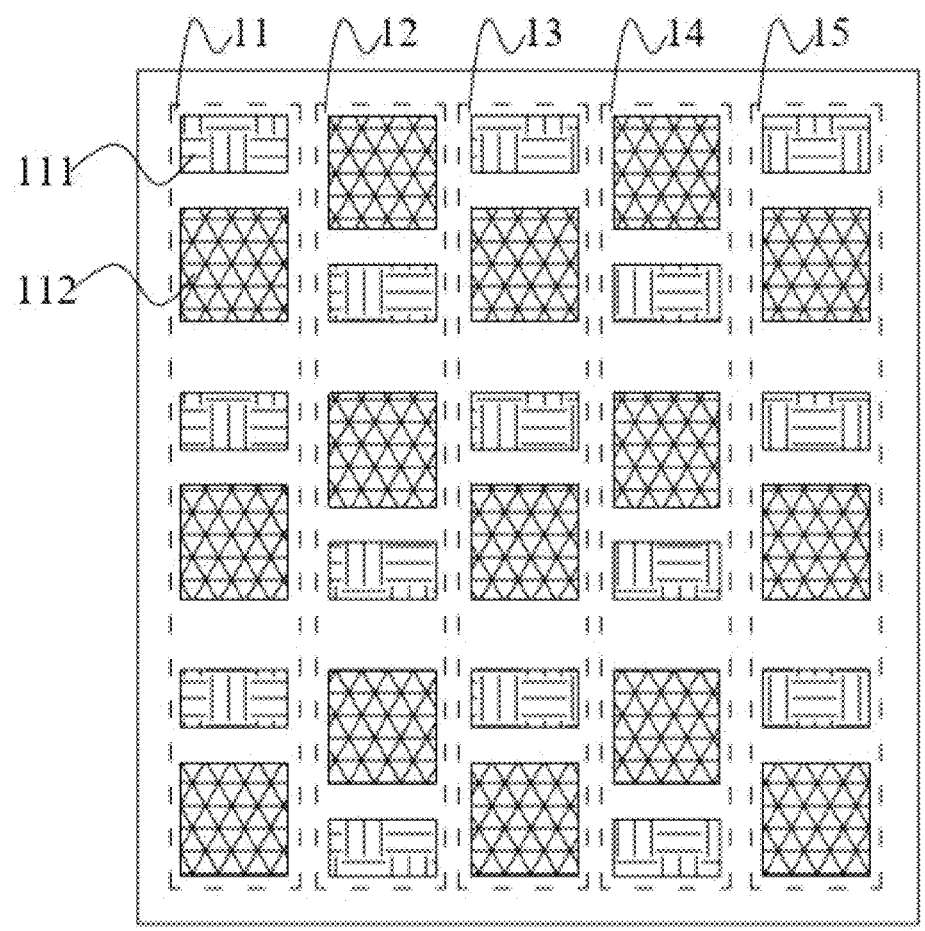
FIG. 5 is a fifth structural diagram of a pixel arrangement structure provided by an embodiment of the present application.

Further, in another embodiment, referring to FIG. 5, an area of the main pixel area111 is smaller than an area of the sub-pixel area 112. That is, the aperture ratio of the main pixel area 111 is smaller than the aperture ratio of the sub-pixel area 112. The brightness of the main pixel area 111 is smaller than the brightness of the sub-pixel area 112. Similarly, the sub-pixel arrangement structure is spaced at most four columns, and the position of the main pixel area 111 and the position of the sub-pixel area 112 are alternately changed to form four different pixel arrangement structures.

Figure 6:
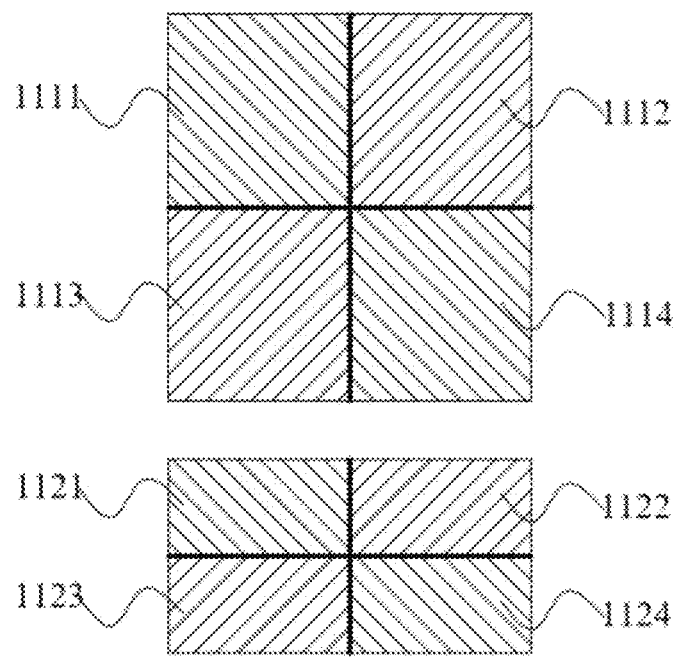
FIG. 6 is a schematic diagram of a first structure of a sub-pixel area according to an embodiment of the present application.
Figure 7:
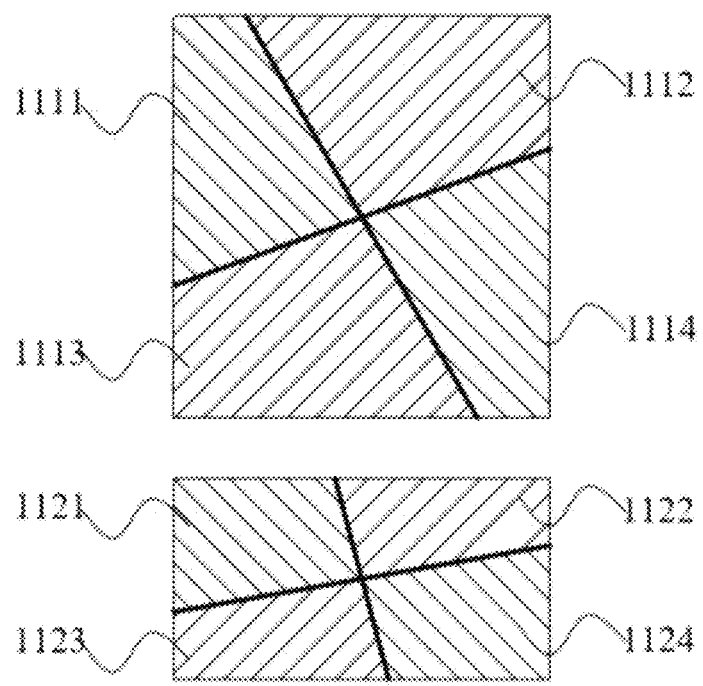
FIG. 7 is a schematic diagram of a second structure of a sub-pixel area according to an embodiment of the present application.

Specifically, each of the main pixel areas 111 and each of the sub-pixel areas 112 further include four pixel domains, that is, a first pixel domain, a second pixel domain, a third pixel domain, and a fourth pixel domain. The areas of the main pixel domains may be equal or not completely equal. The area of each sub-pixel domain may also be equal or not completely equal. However, between the main pixel domains, at least two of the main pixel domains have the same area. Between the sub-pixel domains, at least two of the sub-pixel domains have the same area. Referring to FIG. 6 and FIG. 7, the main pixel area is divided into a first main pixel area 1111, a second main pixel area 1112, a third main pixel area 1113, and a fourth main pixel area 1114. The sub-pixel area is divided into a first sub-pixel area 1121, a second sub-pixel area 1122, a third sub-pixel area 1123, and a fourth sub-pixel area 1124. In FIG. 6, the areas of the first main pixel domain 1111, the second main pixel domain 1112, the third main pixel domain 1113, and the fourth main pixel domain 1114 are equal. The first sub-pixel domain 1121, the second sub-pixel domain 1122, the third sub-pixel domain 1123, and the fourth sub-pixel domain 1124 have the same area.

In FIG. 7, the areas of the first main pixel domain 1111 and the fourth main pixel domain 1114 are equal. Areas of the second main pixel domain 1112 and the third main pixel domain 1113 are equal. The first sub-pixel domain 1121 and the fourth sub-pixel domain 1124 have the same area. Areas of the second sub-pixel domain 1122 and the third sub-pixel domain 1123 are equal. It is preferred that the areas of the main pixel domains are the same and the areas of the sub-pixel domains are the same.

Further, the four pixel domains of each of the main pixel areas 111 and each of the sub-pixel areas 112 are electrically connected to a trunk electrode having a cross shape. The trunk electrode is a boundary dividing a pixel domain. Each of the pixel domains includes a plurality of auxiliary electrodes. The trunk electrode and the auxiliary electrodes together form a fish-bone pixel electrode.

Figure 8:
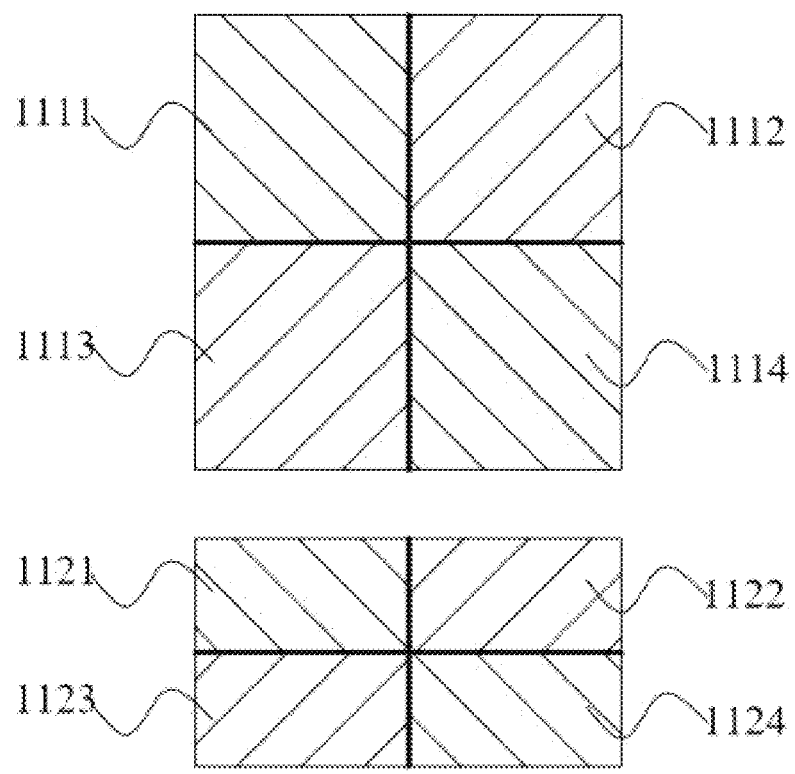
FIG. 8 is a schematic diagram of a third structure of a sub-pixel area according to an embodiment of the present application.

Further, a distance between the adjacent auxiliary electrodes includes many different cases. That is, the auxiliary electrodes have a plurality of different densities. Referring to FIG. 8, a density of auxiliary electrodes in each of pixel domains is smaller than the density of the auxiliary electrodes in each of the above pixel domains. Similarly, the density of the auxiliary electrodes in each of the pixel domains may continue to increase or decrease. Further, in each of the pixel domains, the auxiliary electrodes may extend in the same direction or may extend in different directions. When the auxiliary electrodes extend in different directions, deflection directions of liquid crystal molecules in the four different pixel domains are also different due to a driving voltage, so that a liquid crystal display panel has larger viewing angles.

An embodiment of the present application further provides a display panel, including: a color filter substrate, an array substrate disposed directly opposite to the color filter substrate, and a liquid crystal layer disposed between the color filter substrate and the array substrate. The array substrate is provided with all the features of the pixel arrangement structure described above.

Therefore, the beneficial effects are as follows. First, the pixel arrangement structure provided by the embodiments of the present application includes sub-pixels having multiple colors. Each of the sub-pixels is divided into a main pixel area and a sub-pixel area. The area of the main pixel area is not equal to the area of the sub-pixel area. At most every four columns, that is, one column, two columns, three columns, or four columns, the position of the main pixel area and the position of the sub-pixel area change alternately. This can not only alleviate the low color shift design of the display panel, but also improve uniformity of display brightness of the display panel. Secondly, in the pixel arrangement structure provided in the embodiments of the present application, the area of the main pixel area is larger or smaller than the area of the sub-pixel area. Each of the main pixel areas and each of the sub-pixel areas are further divided into four pixel domains: a first pixel domain, a second pixel domain, a third pixel domain, and a fourth pixel domain. The areas of at least two pixel domains are equal, and the auxiliary electrodes include at least one density, which can further improve display brightness of the display panel.

The pixel arrangement structure and the display panel provided in the embodiments of the present application are described in detail above. Specific examples are used in this article to explain principles and implementation of the present application. The description of the above embodiments is only used to help understand technical solutions of the present application and its core ideas. Those of ordinary skill in the art should understand that they can still modify the technical solutions described in the foregoing embodiments, or equivalently replace some of technical features. These modifications or replacements do not make the essence of the corresponding technical solutions outside the scope of the technical solutions of the embodiments of the present application.

What is claimed is:

1. A pixel arrangement structure, comprising:
  a plurality of sub-pixels having different colors, wherein each of the sub-pixels is divided into a main pixel area and a sub-pixel area, an area of the main pixel area is not equal to an area of the sub-pixel area, the main pixel area and the sub-pixel area are both rectangular, and at most every four columns, a position of the main pixel area and a position of the sub-pixel area are alternately changed to improve brightness uniformity of a display panel;
  wherein the pixel arrangement structure comprises first to sixteenth columns of sub-pixel arrangement structures;
  wherein if the area of the sub-pixel area is greater than the area of the main pixel area, the fifth and sixth columns of sub-pixel arrangement structures are same as the first and second columns of sub-pixel arrangement structures, and the third and four columns of sub-pixel arrangement structures are same as the seventh and eight columns of sub-pixel arrangement structures; or wherein if the area of the sub-pixel area is greater than the area of the main pixel area, the seventh, eighth, and ninth columns of sub-pixel arrangement structures are same as the first, second, and third columns of sub-pixel arrangement structures, and the tenth, eleventh, and twelfth columns of sub-pixel arrangement structures are same as the fourth, fifth, sixth columns of sub-pixel arrangement structures; or wherein if the area of the sub-pixel area is greater than the area of the main pixel area, the ninth, tenth, eleventh, and twelve columns of sub-pixel arrangement structures are same as the first, second, third, and fourth columns of sub-pixel arrangement structures, the thirteenth, fourteenth, fifteenth, and sixteenth columns of sub-pixel arrangement structures are same as the fifth, sixth, seventh, and eighth columns of sub-pixel arrangement structures.

2. The pixel arrangement structure according to claim 1, wherein the plurality of sub-pixels having different colors are: a red sub-pixel, a green sub-pixel, and a blue sub-pixel, or the red sub-pixel, the green sub-pixel, the blue sub-pixel, and a white sub-pixel.

3. The pixel arrangement structure according to claim 2, wherein a pixel arrangement is such that each column is arranged by the main pixel area and the sub-pixel area at intervals, and the position of the main pixel area is exchanged with the position of the sub pixel area every other column; or each column is arranged by the main pixel area and the sub-pixel area at intervals, and the position of the main pixel area is exchanged with the position of the sub-pixel area every two columns; or each column is arranged by the main pixel area and the sub-pixel area at intervals, and the position of the main pixel area is exchanged with the position of the sub-pixel area every three columns; or each column is arranged by the main pixel area and the sub-pixel area at intervals, and the position of the main pixel area is exchanged with the position of the sub-pixel area every four columns.

4. The pixel arrangement structure according to claim 1, wherein the main pixel area and the sub-pixel area both comprise four pixel domains, namely a first pixel domain, a second pixel domain, a third pixel domain, and a fourth pixel domain.

5. The pixel arrangement structure according to claim 4, wherein areas of at least two pixel domains of the first pixel domain, the second pixel domain, the third pixel domain, and the fourth pixel domain are same.

6. The pixel arrangement structure according to claim 4, wherein the four pixel domains of the main pixel area and the sub-pixel area are electrically connected to a trunk electrode having a cross shape, each of the four pixel domains further comprises a plurality of auxiliary electrodes, and the trunk electrode and the auxiliary electrodes together form a fish-bone pixel electrode.

7. The pixel arrangement structure according to claim 6, wherein the auxiliary electrodes comprise at least one density.

8. A pixel arrangement structure, comprising:

a plurality of sub-pixels having different colors, wherein each of the sub-pixels is divided into a main pixel area and a sub-pixel area, an area of the main pixel area is not equal to an area of the sub-pixel area, and at most every four columns, a position of the main pixel area and a position of the sub-pixel area are alternately changed to improve brightness uniformity of a display panel;

wherein the pixel arrangement structure comprises first to sixteenth columns of sub-pixel arrangement structures;

wherein if the area of the sub-pixel area is greater than the area of the main pixel area, the fifth and sixth columns of sub-pixel arrangement structures are same as the first and second columns of sub-pixel arrangement structures, and the third and four columns of sub-pixel arrangement structures are same as the seventh and eight columns of sub-pixel arrangement structures; or wherein if the area of the sub-pixel area is greater than the area of the main pixel area, the seventh, eighth, and ninth columns of sub-pixel arrangement structures are same as the first, second, and third columns of sub-pixel arrangement structures, and the tenth, eleventh, and twelfth columns of sub-pixel arrangement structures are same as the fourth, fifth, sixth columns of sub-pixel arrangement structures; or wherein if the area of the sub-pixel area is greater than the area of the main pixel area, the ninth, tenth, eleventh, and twelve columns of sub-pixel arrangement structures are same as the first, second, third, and fourth columns of sub-pixel arrangement structures, the thirteenth, fourteenth, fifteenth, and sixteenth columns of sub-pixel arrangement structures are same as the fifth, sixth, seventh, and eighth columns of sub-pixel arrangement structures.

9. The pixel arrangement structure according to claim 8, wherein the plurality of sub-pixels having different colors are: a red sub-pixel, a green sub-pixel, and a blue sub-pixel, or the red sub-pixel, the green sub-pixel, the blue sub-pixel, and a white sub-pixel.

10. The pixel arrangement structure according to claim 9, wherein a pixel arrangement is such that each column is arranged by the main pixel area and the sub-pixel area at intervals, and the position of the main pixel area is exchanged with the position of the sub pixel area every other column; or each column is arranged by the main pixel area and the sub-pixel area at intervals, and the position of the main pixel area is exchanged with the position of the sub-pixel area every two columns; or each column is arranged by the main pixel area and the sub-pixel area at intervals, and the position of the main pixel area is exchanged with the position of the sub-pixel area every three columns; or each column is arranged by the main pixel area and the sub-pixel area at intervals, and the position of the main pixel area is exchanged with the position of the sub-pixel area every four columns.

11. The pixel arrangement structure according to claim 9, wherein the main pixel area and the sub-pixel area both comprise four pixel domains, namely a first pixel domain, a second pixel domain, a third pixel domain, and a fourth pixel domain.

12. The pixel arrangement structure according to claim 11, wherein areas of at least two pixel domains of the first pixel domain, the second pixel domain, the third pixel domain, and the fourth pixel domain are same.

13. The pixel arrangement structure according to claim 11, wherein the four pixel domains of the main pixel area and the sub-pixel area are electrically connected to a trunk electrode having a cross shape, each of the four pixel domains further comprises a plurality of auxiliary electrodes, and the trunk electrode and the auxiliary electrodes together form a fish-bone pixel electrode.

14. The pixel arrangement structure according to claim 13, wherein the auxiliary electrodes comprise at least one density.

15. A display panel, comprising: a color filter substrate, an array substrate disposed directly opposite to the color filter substrate, and a liquid crystal layer disposed between the color filter substrate and the array substrate; wherein the array substrate comprises the pixel arrangement structure according to claim 1.

* * * * *